June 9, 1931.          H. J. EDWARDS                 1,809,585
                      ENGINE VALVE SLEEVE
              Filed June 7, 1927      2 Sheets-Sheet 1
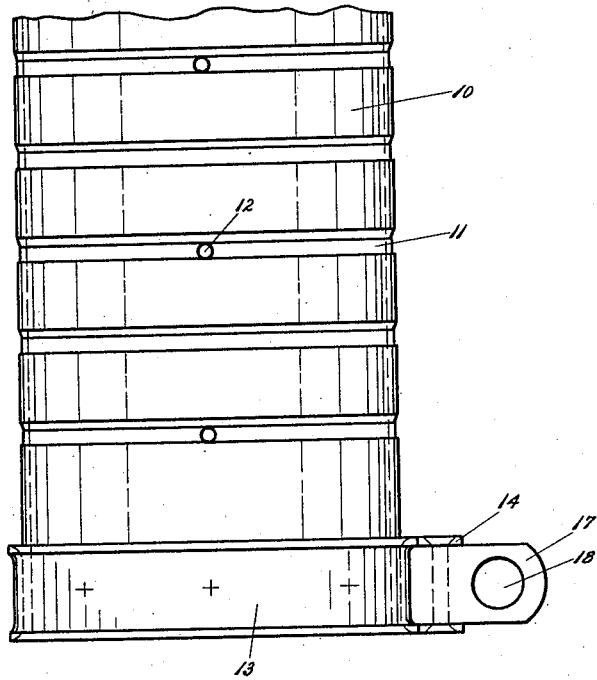
Fig. I.
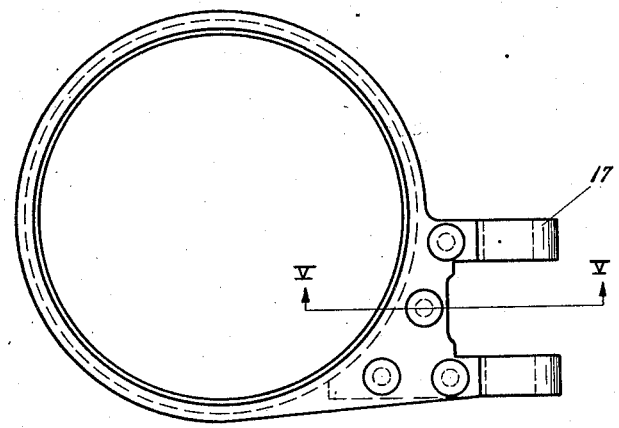
Fig. II.
INVENTOR.
HENRY J. EDWARDS.
BY Chester H. Braselton
ATTORNEY.

June 9, 1931.  H. J. EDWARDS  1,809,585
ENGINE VALVE SLEEVE
Filed June 7, 1927    2 Sheets-Sheet 2
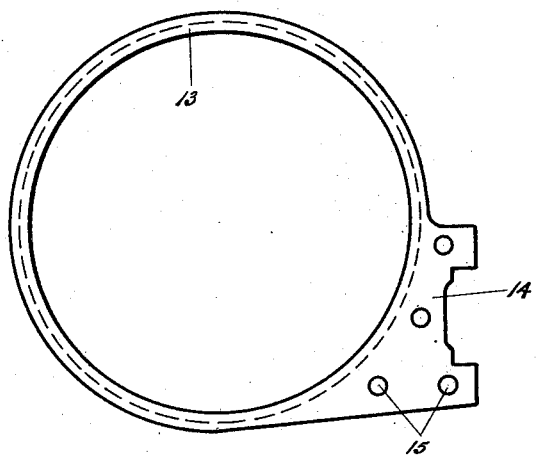
Fig. III.
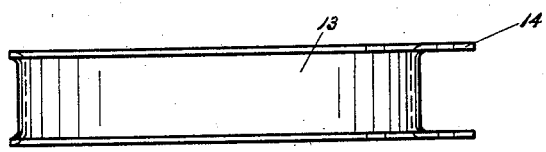
Fig. IV.
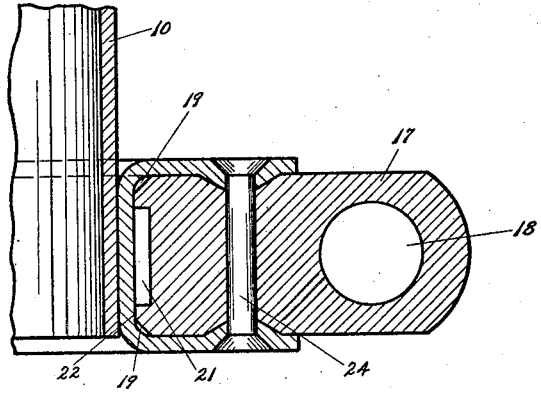
Fig. V.
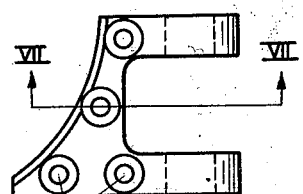
Fig. VI.
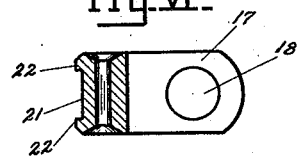
Fig. VII.
INVENTOR.
HENRY J. EDWARDS.
BY Chester H. Braselton
ATTORNEY.

Patented June 9, 1931

1,809,585

UNITED STATES PATENT OFFICE

HENRY J. EDWARDS, OF TOLEDO, OHIO, ASSIGNOR TO THE WILLYS-OVERLAND COMPANY, OF TOLEDO, OHIO, A CORPORATION OF OHIO

ENGINE VALVE SLEEVE

Application filed June 7, 1927. Serial No. 197,069.

My invention relates to internal combustion engines of the sleeve valve class, and it has particular relation to a novel assembled valve sleeve.

One of the objects of the invention is to provide a valve sleeve for engines of the above designated class, the design of which affords a material saving in cost of manufacture and entails a simplified method of construction.

It is a further object of this invention to provide a fabricated or assembled steel which is formed of a cylindrical member of uniform thickness having a novel reinforcing band construction adjoining the lower extremity.

An additional object of the invention resides in the provision of a novel bearing lug assembly.

Another object of the invention is to provide a valve sleeve composed of individual metallic parts which are readily available or manufactured and which may be assembled without suscepting the same to distortive influences.

It is recognized that by obviating certain disadvantages incident to the fabrication and operation of sleeve valve engines embodying steel sleeves, an engine having generally improved properties over the conventional cast iron structure would result. The disadvantages incident to the operation of a steel sleeve valve engine are overcome in various ways. By my invention there is provided a steel sleeve structure which may be fabricated of readily available and inexpensive materials without incurring difficulties which are often met in large scale production operations.

According to the present invention I employ a seamless tubing of steel or other suitable material, which is of a desired gauge. The tubing is cut into sections of required length which are grooved and fitted with ports in a manner resembling a cast iron sleeve fabricating operation. In order to reinforce the base portion which is joined to the cam actuating means, there is provided a flanged ring which fits the outer surface of the sleeve snugly and is secured thereto by any convenient expedient, such for example, as spot welding. Several apertures are formed through the flanged portion of the ring which register with apertures in a forged bearing lug that is made secure thereto by means of rivets. The joint is strengthened by indentures formed in the lug which register with projecting portions integral with the flanged members.

The details of a preferred embodiment of the invention and a better understanding of its general principles may be had by referring to the drawings in which Figure I is an elevational view of a portion of a sleeve illustrating one embodiment of the invention.

Fig. II is a plan view of the structure illustrated in Fig. I.

Fig. III is a plan view of the reinforcing ring illustrating the apertures for securing the bearing lug.

Fig. IV is an elevational view of the structure illustrated in Fig. III.

Fig. V is a sectional veiw along the line V—V of Fig. III.

Fig. VI is a plan view of the lug; and

Fig. VII is a sectional view along the line VII—VII of Fig. VI.

In practicing the present invention there is provided a seamless tube 10 of steel or other suitable material, which is of the desired transverse dimensions. Such a tube is cut into length and provided with port openings, (not shown), oil distributing grooves 11 and holes 12, such as are formed on the conventional sleeves. A reinforcing band 13 is then formed, preferably by a suitable stamping operation, to assume a contour resembling that illustrated in Figs. III and IV. It has an internal diameter substantially equivalent to the external diameter of the cylindrical member. The edges are turned substantially 90° in order to reinforce the ring. In one quadrant the flanged portion 14 extends radially beyond that of the other quadrants, and are provided with a plurality of apertures 15.

A bearing lug 17 having an opening 18 to receive an eccentric rod connecting pin is fitted between the flanged portions of the reinforcing ring. Its chamfered edges 19 register with the arcuate portion of the reinforcing ring formed by the stamping operation.

In addition it includes a recessed portion 21 and two narrow bands 22, which engage the coaxial portion of the ring 13. A plurality of beveled apertures 23 are spaced to register with those formed in the reinforcing ring whereas the adjoining portion of the flange may be pressed into the bevel substantially as illustrated in Fig. V. Rivets 24 function positively to interconnect the ring with the bearing lug. The lug member may be made conveniently by forging operations, or it may be cast if so desired.

It will be observed that the elements constituting the assembly are not difficult to manufacture and that the mode of fabrication is such as not to endanger the symmetry of the cylindrical portion which may be of comparatively thin gauge. Furthermore, the flanged portion of the ring enhances its reinforcing qualities and assures a substantial and otherwise satisfactory structure.

Although there is described but a single embodiment of the present invention, it will be apparent to those skilled in the art that the principles underlying the same are not so restricted, but may be extended to include other embodiments without departing from its scope, wherefore, I desire that the invention be limited only as indicated in the appended claims.

I claim:

1. A sleeve for internal combustion engines comprising a cylindrical sheet metal member, a flanged sheet metal annular member rigidly secured to the base portion of the sleeve, and a bearing lug rigidly secured to the flange of the annular member.

2. A sleeve for internal combustion engines comprising a sheet metal cylinder, a sheet metal ring having its edges turned radially of the cylinder and rigidly secured to the lower portion thereof, and a bearing lug fitting between the turned edges and rigidly secured to the annular member.

3. A sleeve for internal combustion engines comprising a cylindrical member, a reinforcing annular member encircling the lower portion of the cylinder and rigidly secured thereto, having its edges turned radially of the cylinder, and a bearing lug rigidly secured to the ring member and disposed between the edges thereof, the lug and the edge portions of the cylinder member being provided with engaging indenture and recessed portions.

4. The combination of a sleeve, an annular member rigidly secured to the base portion thereof adapted to reinforce the same, said annular member being provided with radially flanged portions having apertures therein, a bearing lug adapted to be secured between the flanges provided with apertures to register with the apertures in the ring, and rivets joining said lug and said annular member.

5. A sleeve for internal combustion engines comprising a hollow steel cylinder, a sheet steel ring welded to the base of said cylinder and provided with an annular flange, and a forged bearing lug riveted to said flange.

6. A sleeve for internal combustion engines comprising a hollow cylinder, a sheet metal ring having its edges turned radially outward secured to the base of said cylinder, and a bearing lug having a curved side fitting against said ring and between said flanges, and having two substantially straight parallel sides, one of said sides being substantial radial and the other being substantially tangential with respect to said cylinder and ring.

In testimony whereof, I affix my signature.

HENRY J. EDWARDS.